United States Patent [19]
Fite et al.

[11] Patent Number: 5,604,873
[45] Date of Patent: Feb. 18, 1997

[54] CIRCUITRY FOR CONTROLLING POWER APPLICATION TO A HOT DOCKING SCSI SCA DISK DRIVE

[75] Inventors: Robert J. Fite, Hillsboro; David A. Underwood, Scappoose; Dale Rembold, Boring, all of Oreg.

[73] Assignee: Intel Corporation, Santa Clara, Calif.

[21] Appl. No.: 366,230

[22] Filed: Dec. 28, 1994

[51] Int. Cl.$^6$ ......................................... H01J 13/00
[52] U.S. Cl. ................. 395/283; 395/281; 395/282; 395/750; 395/733
[58] Field of Search ..................... 395/750, 281, 395/282, 283, 700, 425, 800, 894; 369/75.1; 364/708; 371/10.1; 360/39

[56] References Cited

U.S. PATENT DOCUMENTS

| | | | |
|---|---|---|---|
| 4,999,787 | 3/1991 | McNally et al. | 364/514 |
| 5,077,722 | 12/1991 | Geist et al. | 369/75.1 |
| 5,297,067 | 3/1994 | Blackborow et al. | 364/708 |
| 5,303,244 | 12/1994 | Watson | 371/10.1 |
| 5,317,697 | 4/1994 | Husak et al. | 395/283 |
| 5,386,567 | 1/1995 | Lien et al. | 395/700 |
| 5,454,080 | 9/1995 | Fasig et al. | 395/283 |
| 5,488,572 | 1/1996 | Belmont | 364/514 R |

*Primary Examiner*—Jack B. Harvey
*Assistant Examiner*—Raymond N. Phan
*Attorney, Agent, or Firm*—Blakely, Sokoloff, Taylor & Zafman

[57] ABSTRACT

A disk drive controller having a plurality of disk drive interfaces, each interface includes a connector, a delay circuit, and a set of power application circuits is provided to a server to support hot docking of SCA drives. Each connector is adapted to mate with a hot docking disk drive having equal length connecting pins, and detect the presence of such disk drive when the hot docking disk drive makes contact with the connector. Each delay circuit generates a set of properly delayed enabling signals to the corresponding power application circuits. Each set of power application circuits regulates power applications to the hot docking disk drive making contact with the corresponding connector. The delayed and regulated manner of applying power prevents voltage and power swings that might disrupt on-going operations and/or cause damages to the neighboring drives.

24 Claims, 6 Drawing Sheets

5,604,873

CIRCUITRY FOR CONTROLLING POWER APPLICATION TO A HOT DOCKING SCSI SCA DISK DRIVE

BACKGROUND OF THE INVENTION

1. Field of the Invention

The present invention relates to the fields of disk drives and computer systems. In particular, the present invention relates to controlling power application when hot docking a Small Computer System Interface (SCSI) Single Connector Attachment (SCA) disk drive.

2. Background Information

As more and more microprocessor based servers are employed in various critical or sensitive business or scientific applications, the expectation of their reliability and availability increases in tandem. A particular aspect that is of increasing interest is the availability and reliability of the server's disk drives. In today's servers, it is not uncommon to find a not insignificant number of disk drives storing many gigabytes of data. As a result, hot swappable or hot dockable disk drives have emerged as a high priority feature.

Hot swapping or hot docking refers to the ability to remove a malfunctioning disk drive from the server and reinsert a properly functioning disk drive into the server without having to halt and/or otherwise shut the server down. Excessive power and voltage swings must be prevented when removing the malfunctioning disk drive and reinserting the replacement drive, to prevent disruption to operations and/or physical damages to the neighboring drives. The conventional approach is to employ disk drives having connecting pins that are of uneven lengths. More specifically, special 5 v and 12 v pins having lengths that are longer than associated pins are used to make preliminary electrical contacts with the power supply of the server, thereby stabilizing the power and voltage of the server, before the shorter operational pins would make full electrical contact with the power supply of the server.

An SCA drive by definition has equal length connecting pins. Thus, traditionally SCA drives are not considered to be hot swappable or hot dockable. Since SCA drives, due to other reasons, are a lot more economical than most of the hot dockable drives employed today, it is desirable to be able to hot dock SCA drives.

As will be disclosed in more detail below, the circuitry of the present invention controls power application to a hot docking SCA disk drive, thereby allowing the SCA disk drive to be hot dockable. These and other advantages will be evident to those skilled in art from the detailed descriptions to follow.

SUMMARY AND OBJECTS OF THE INVENTION

The desirable results are advantageously achieved by providing a disk drive controller having a plurality of disk drive interfaces, each interface includes a connector, a delay circuit and a set of power application circuits. Each connector is adapted to mate with a docking disk drive having equal length connecting pins, and to report the presence of such disk drive making contact with the connector. The delay circuit is used to generate a set of properly delayed enabling signals to allow time for the connector to go from partial engagement to full engagement. The delayed enabling signals are generated responsive to the reported disk drive presence. Each set of power application circuits are used to apply power to the docking disk drive making contact with the corresponding connectors, in a regulated manner, to prevent in rush of current due to changing loads. The power is applied responsive to the delayed enabling signals. The delayed and regulated manner of applying power prevents voltage and power swings that might disrupt on-going operations and/or cause damages to the neighboring drives.

In one embodiment, the delay circuit comprises primarily a delay timer coupled to the corresponding connector and a power supply, and a flip flop serially coupled to delay timer. In one variation of this embodiment, the delay circuit further comprises a number of Boolean gates complementing the delay timer and the flip flop for factoring the fault state of the corresponding drive in generating the set of properly delayed enabling signals. In an alternate embodiment, a micro-controller is employed to generate the set of properly delayed enabling signals for the various sets of power application circuits.

In one embodiment, each set of power application circuits includes a primary power application circuit for applying power to the docking disk drive making contact with the corresponding connector via a +12 v line, and a secondary power application circuit for applying power to the same corresponding connector via a +5 v line. Both power application circuits are equipped with the ability to apply the power in a gradual manner. In a particular variation of this embodiment, the primary and secondary power application circuits are similarly constituted. Each circuit comprises primarily of a gate coupled to the power input and a FET transistor serially coupled to the gate. Preferably, each power application circuit is further provided with another parallel connection to the FET transistor to serve as a by-pass to compensate for the step load requirement of the docking disk drive.

BRIEF DESCRIPTION OF DRAWINGS

The present invention will be described by way of exemplary embodiments but not limitations illustrated in the accompanying drawings in which like references denote similar elements, and in which.

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention.

Figure 1:
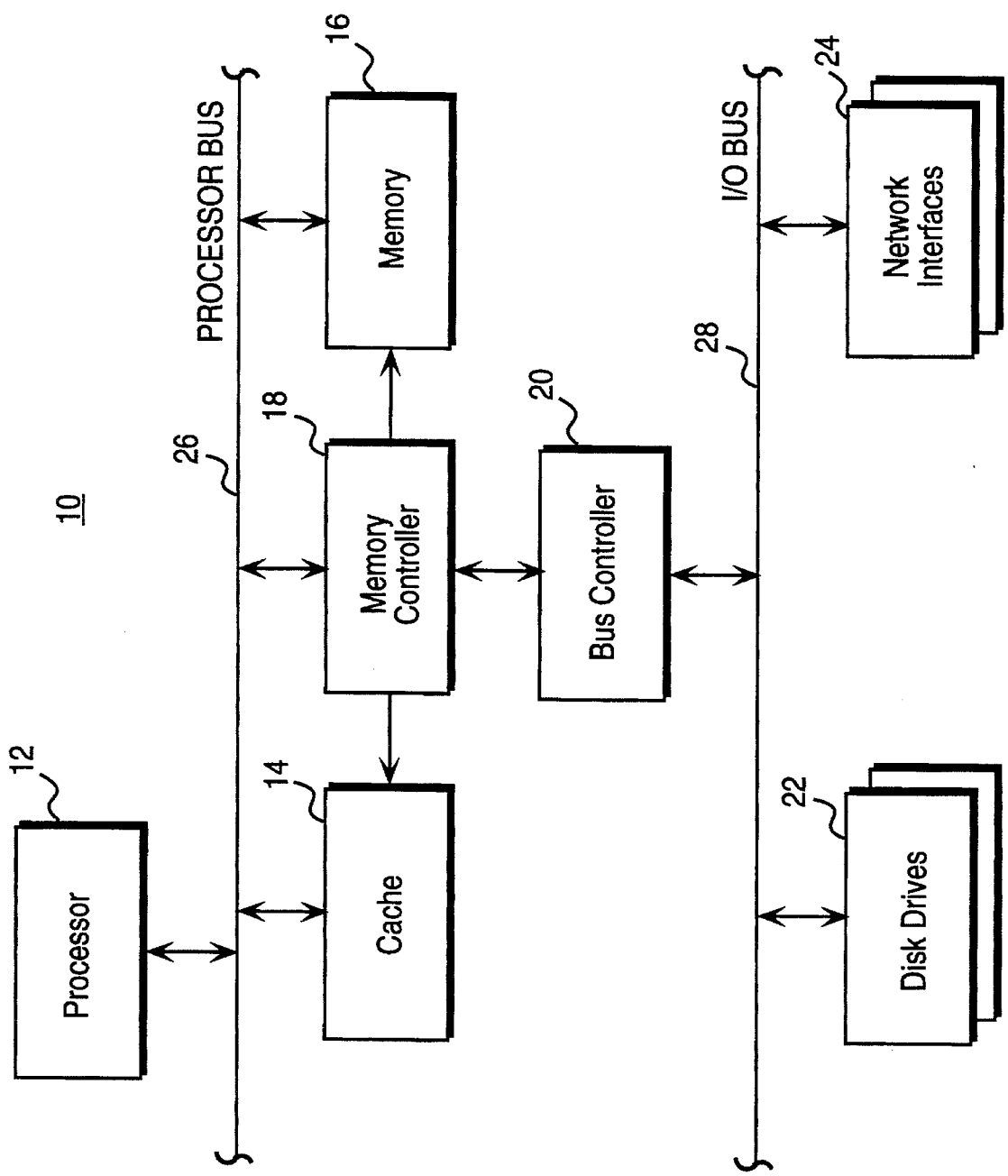
FIG. 1 illustrates an exemplary server incorporating the teachings of the present invention.

Referring now to FIG. 1, a block diagram illustrating an exemplary computer server incorporating the teachings of the present invention. The computer server 10 comprises processor 12, cache memory 14, main memory 16, and memory controller 18 coupled to each other via a processor bus 26. The computer server 10 further comprises bus controller 20, disk drives 22 and network interfaces 24 coupled to each other via input/output (I/O) bus 28. Memory and bus controllers 18 and 20 are also coupled to each other. The disk drives 22 are SCA drives and include a SCA disk drive controller incorporated with the teachings of the present invention, enabling the SCA disk drives 22 to be hot dockable.

Before describing the present invention in further detail, it should be noted that while the present invention is being described in the context of the above described exemplary computer server 10, the present invention may be practiced in computer servers having different system architectures. In fact, based on the descriptions to follow, it will be appreciated that the present invention may also be practiced on desktop computers, notebook computers and the like.

Figure 2:
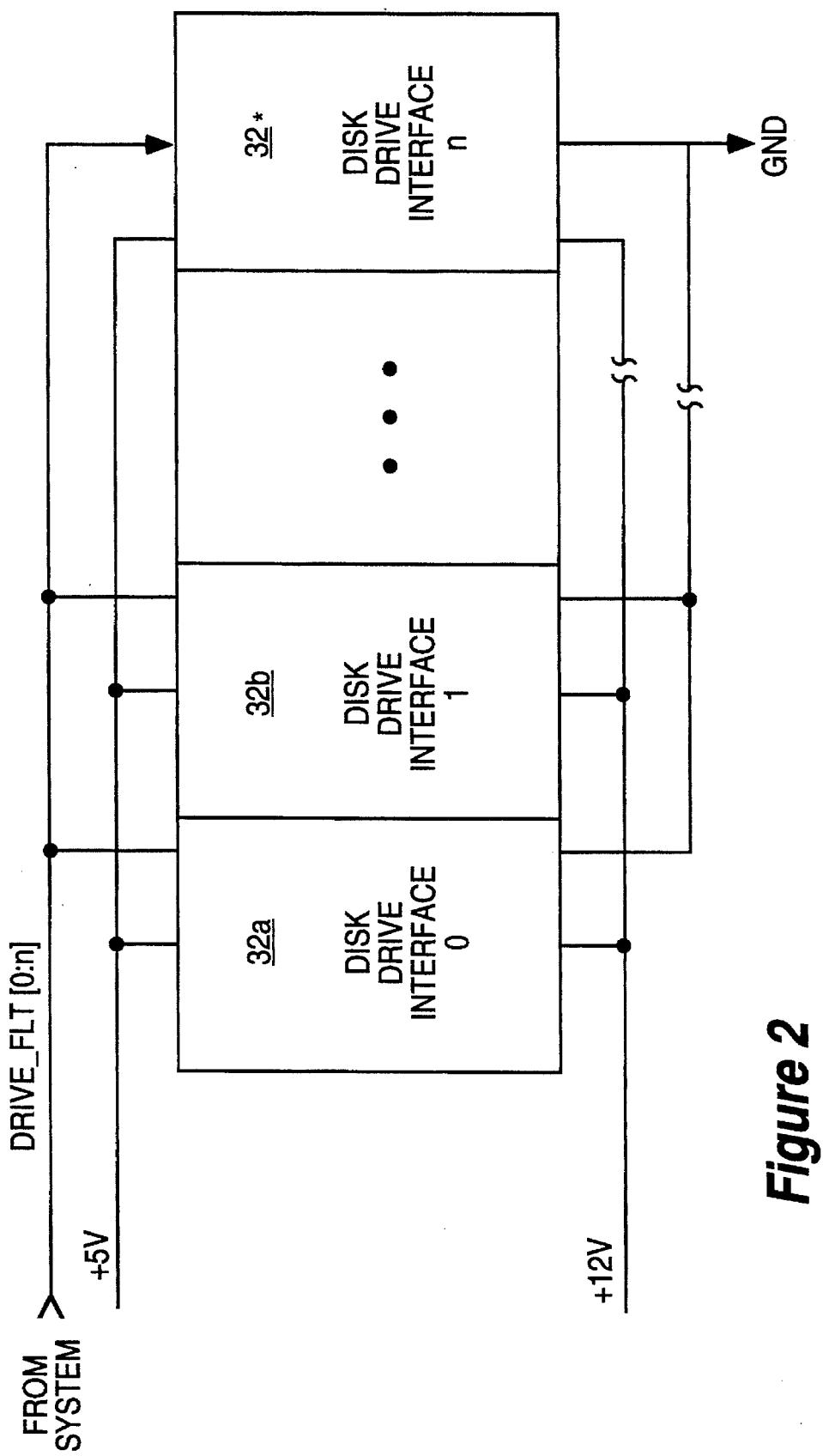
FIG. 2 illustrates the relevant portions of one embodiment of the disk drive controller of the present invention employed by the exemplary server of FIG. 1.

Referring now to FIG. 2, which illustrates the relevant portions of one embodiment of the SCA disk controller 30 in further detail. Disk drive controller 30 includes disk drive interfaces 32a–32\* incorporated with the teachings of the present invention. Disk drive interfaces 32a–32\* are identical interfaces serially coupled to each other and receiving power supply via a set of various voltage lines. For the illustrated embodiment, disk drive interfaces 32a–32\* further receive drive fault states (DRIVE_FLT [0:n]) as inputs. Drive fault states denote whether faults are detected by the server 10 for the various disk drives 22; and they are set and reset by the server 10.

In one embodiment, disk drive controller 30 includes eight (8) such disk drive interfaces 32a–32h. All eight interfaces 32a–32h receive a primary power input via a +12 v line and a secondary power input via a +5 v line. In this embodiment, all eight interfaces 32a–32h also receive their corresponding fault states (DRIVE_FLT [0:8]) as inputs.

Figure 3:
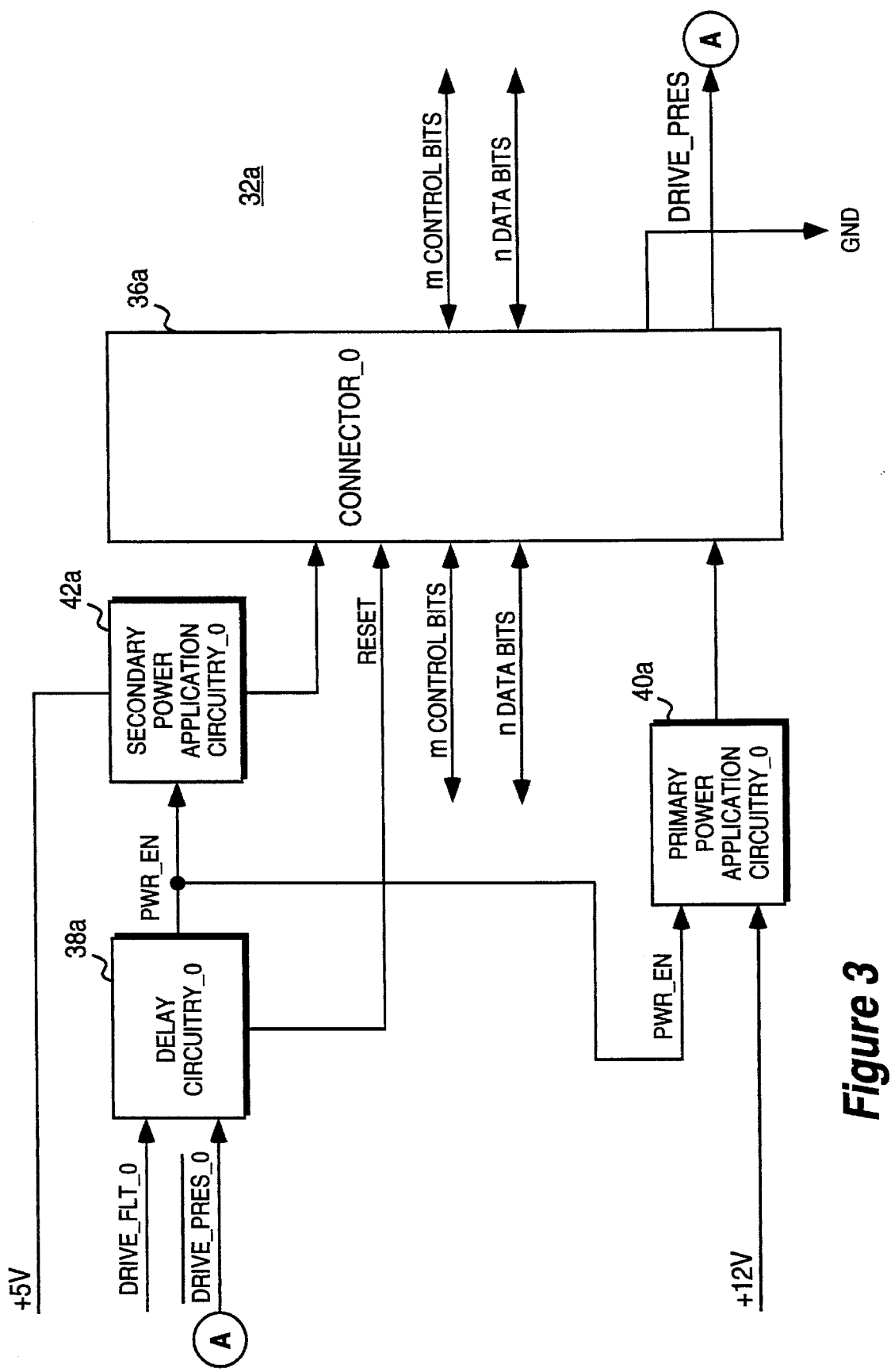
FIG. 3 illustrates one embodiment of one of the disk drive interfaces of FIG. 2 in further detail.

Referring now to FIG. 3, one embodiment of first disk drive interface 32a is illustrated in further detail. As illustrated, first disk drive interface 32a comprises a connector 36a, delay circuit 38a and a set of power application circuits 40a–42a. For the illustrated embodiment, the set of power application circuits 40a–42a includes a primary power application circuit 40a and a secondary power application circuit 42a.

Connector 36a is adapted to mate with a docking disk drive having equal length connecting pins, and detect the presence of such disk drive (DRIVE_PRES_0) when the disk drive makes contact with the connector 36a. Delay circuit 38a generates the properly delayed enabling signals (PWR_EN_0) for the power application circuits 40a–42a, allowing time for the connector 36a to go from initial partial engagement to full engagement. Enabling signal PWR_EN_0 is generated responsive to the detection signal (DRIVE_PRES_0) factoring in the drive's fault state (DRIVE_FLT_0). Primary and secondary power application circuits 40a–42a are used to regulate a first and a second power application to connector 36a via a +12 v and a +5 v line, preventing in rush of currents as a result of changing load. Both primary and secondary power are applied gradually responsive to properly delayed enabling signals PWR_EN_0.

The amount of time delays required to allow the connector 36a to go from partial engagement to full engagement is dependent on the physical characteristics of the disk driver carrier. In one embodiment, the required delay time is about ¼ sec. The rate of power application is dependent on the frequency responsiveness of the power supplies. In one embodiment, the rate of power application is about 500 usec. The delayed and regulated manner of applying power prevent power and voltage swings that might interrupt on going operations or cause damages to the neighboring disk drives.

Figure 4:
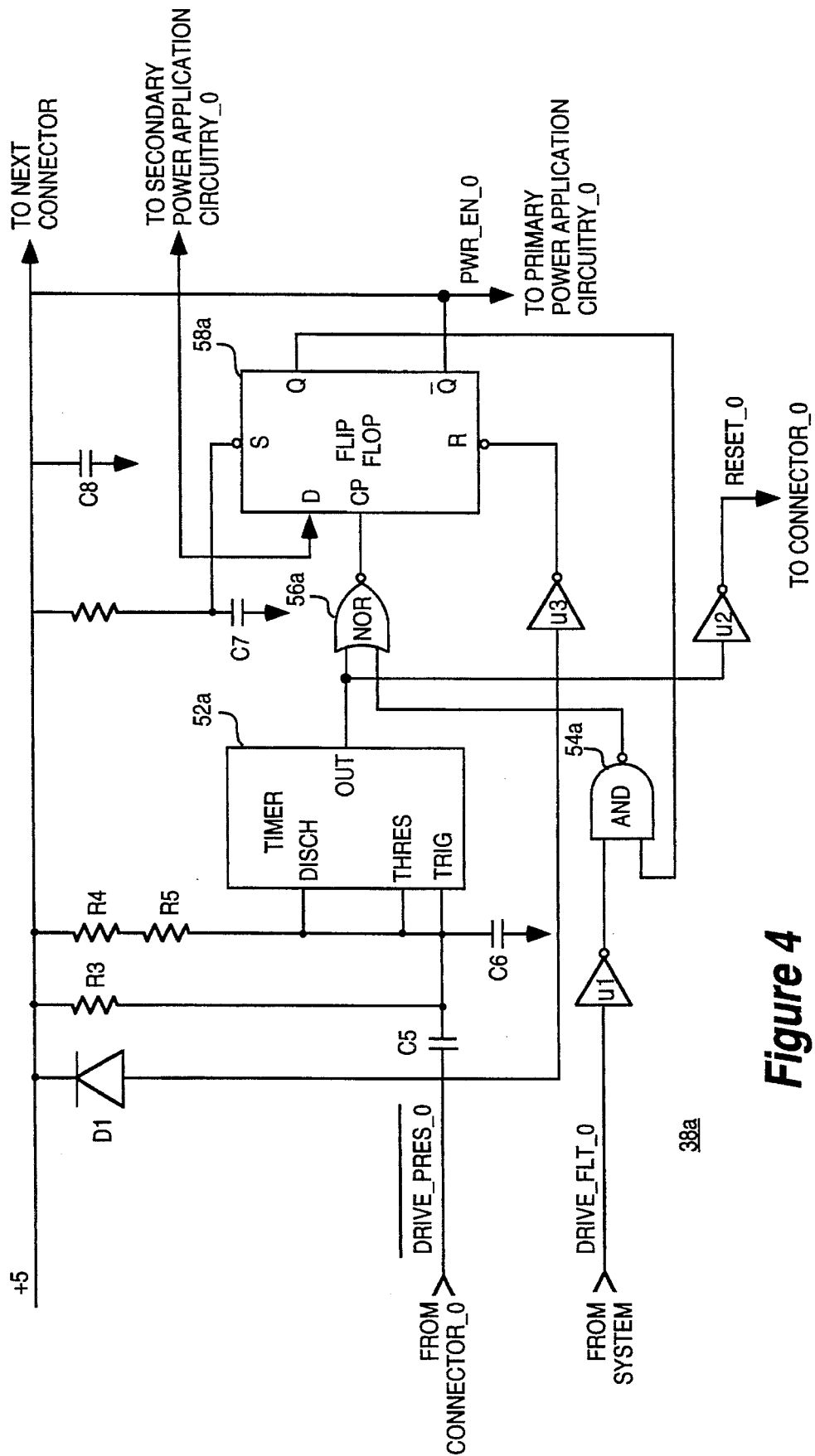
FIG. 4 illustrates one embodiment of the delay circuitry of FIG. 3 in further detail.

Referring now to FIG. 4, which illustrates one embodiment of delay circuit 38a in further details. As illustrated, delay circuit 38a primarily comprises of a delay timer 52a coupled to the corresponding connector and a power supply, and a flip flop 58a serially couple to the delay timer 52a. More specifically, the discharge and threshold terminals of delay timer 52a is coupled to the power supply of the +5 v line via resistors R4 and R5, and the trigger terminal of delay timer 52a is coupled to the corresponding connector. Flip flop 58a is serially coupled to the output terminal of delay timer 52a. Additionally, for the illustrated embodiment, AND gate 54a and NOR gate 56a are provided to complement delay timer 52a and flip flop 58a to allow the drive's fault state to be factored in the generation of the properly delayed enabling signal (PWR_EN_0).

Delay circuit 38a outputs active PWR_EN_0 upon receiving the complement of DRIVE_PRES_0 denoting the presence of the corresponding drive, applying proper amount of delay and ensuring the fault state (DRIVE_FLT_0) of the corresponding drive has been reset by the server. The various resistor and capacitor values are empirically determined. In one embodiment, the values of R4 and R5 are 2M and 1M ohms respectively.

Figure 5:
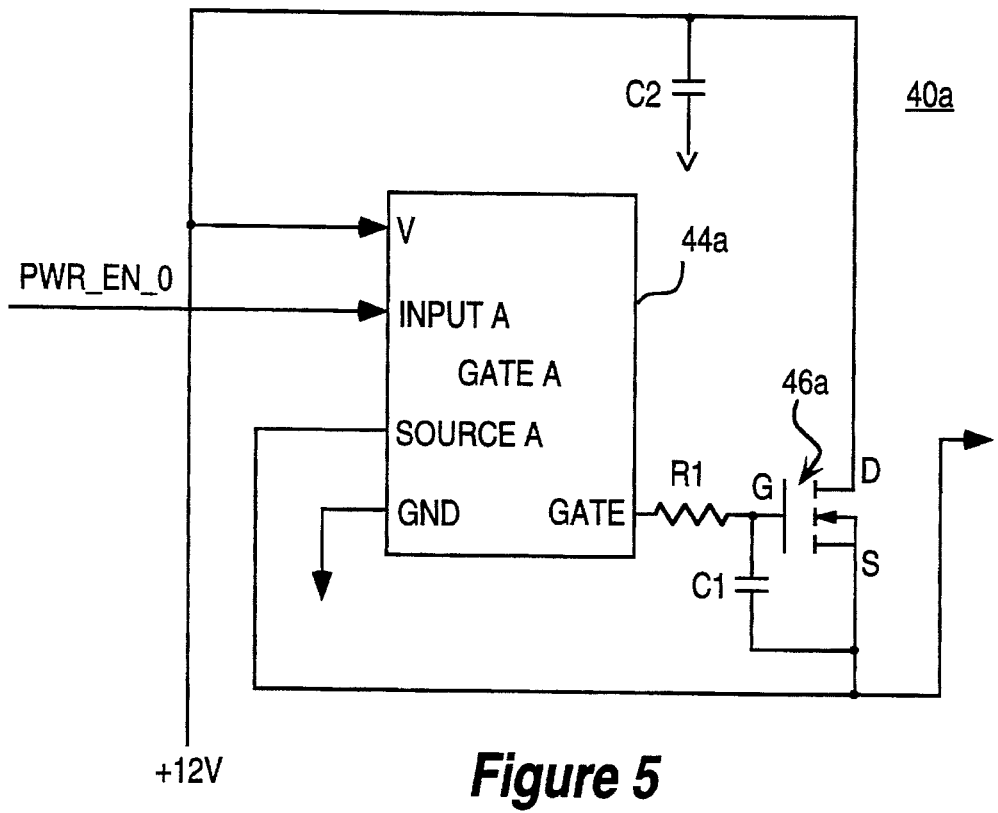
FIGS. 5–6 illustrate one embodiment each of the primary and secondary power application circuitry of FIG. 3 in further detail.
Figure 6:
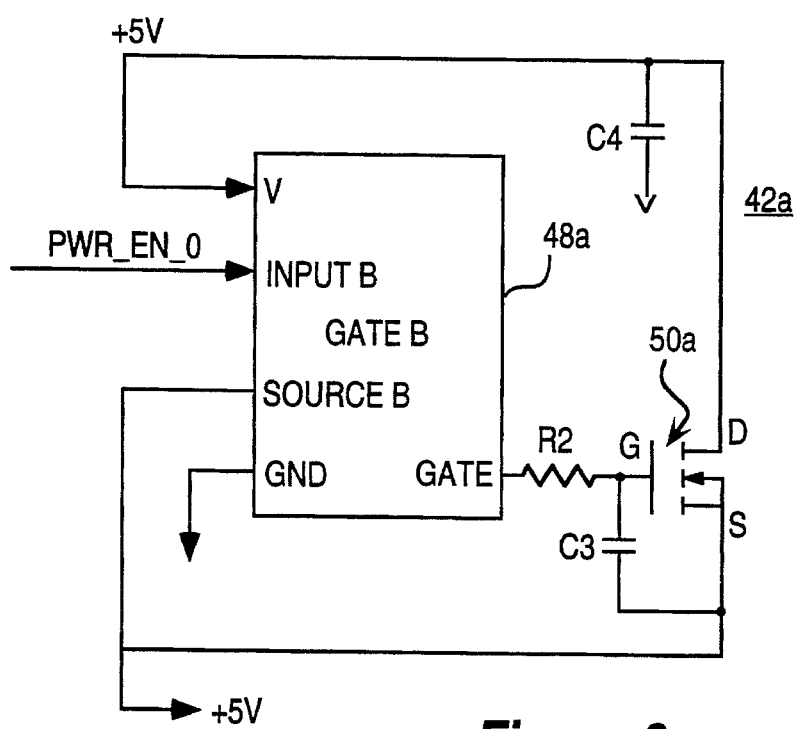

Referring now to FIGS. 5–6, which illustrate one embodiment each of primary and secondary power application circuits 40a–42a in further details. As illustrated, primary and secondary power application circuits 40a–42a are similarly constituted. Each circuit 40a or 42a comprises primarily of gate 44a or 48a coupled to the power supply via either the +12 v or the +5 v line, and FET transistor 46a or 50a serially coupled to gate 44a or 48a. More specifically, the output terminal of gate 44a or 48a is serially coupled to the gate input terminal of FET transistor 46a or 50a through resistor R1 or R2. Preferably, each circuit 40a or 42a further includes another parallel connection between the power supply on the +12 v or +5 v line and FET transistor 46a or 50a having C2 and C4 coupled to ground as shown. More specifically, the parallel connections are between the power supply of the +12 v and +5 v lines and the drains of FET transistors 46a and 50a respectively.

Gate 44a or 48a prevents the power supplied via the +12 v or +5 v to be applied, unless the properly delayed enabling signal (PWR_EN_0) is active. If PWR_EN_0 is active, power supplied via the +12 v and +5 v lines are applied through FET transistors 46a and 50a respectively. However, because of R1 and C1, and R2 and C3, the power from the +12 v and +5 v lines are applied gradually. The parallel connections (including C2 and C4) serve as by-passes to the FET transistors 46a and 50a for compensating the step load requirement of the disk drive.

The values for R1, R2, and C1–C4 are empirically determined. In one embodiment, the values of R1 and R2 are 1M ohms and 300K ohms respectively, whereas the values of C1–C4 are all 0.01 uF.

Figure 7:
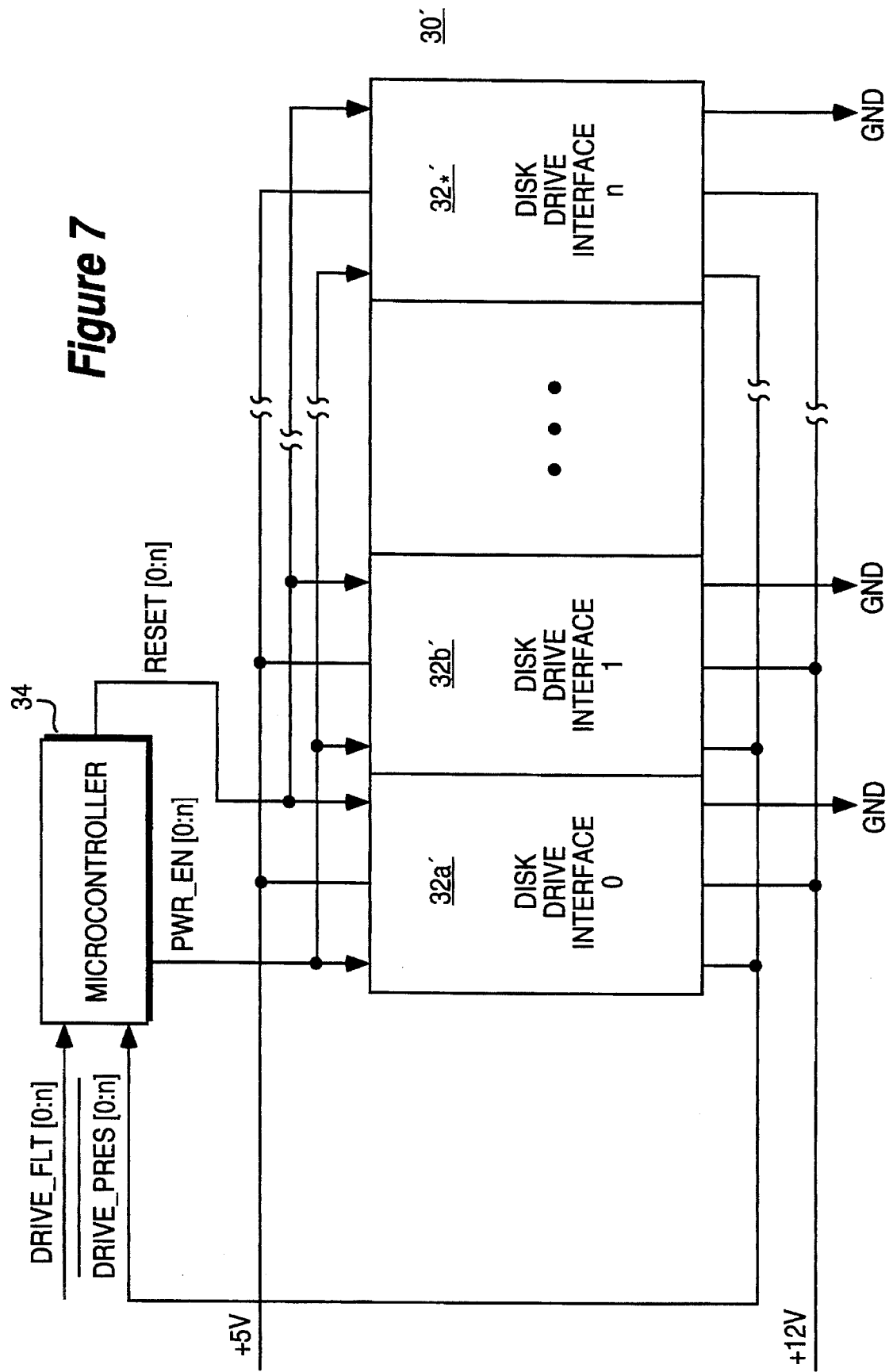
FIG. 7 illustrates the relevant portions of an alternate embodiment of the disk drive controller of the present invention employed by the exemplary server of FIG. 1.

Referring now to FIG. 7, an alternate embodiment of disk drive controller 30' is illustrated. Disk drive controller 30' similarly comprises disk drive interfaces 32a'–32*'. However, in lieu of providing a delay circuit to each of the disk drive interfaces 32a'–32*', micro-controller 34 is provided instead. DRIVE_PRES [0:n] and DRIVE_FLT [0:n] are all routed to micro-controller 34. In response, micro-controller 34 generates PWR_EN [0:n] as described earlier.

Thus, a circuit for controlling power application to a hot docking SCSI SCA disk drive is described. While the circuit of the present invention has been described in terms of the illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A disk drive interface comprising:
   a) a connector interface for mating with a hot docking disk drive having equal length connecting pins and detecting the hot docking disk drive's presence when the hot docking disk drive's equal length connecting pins make contact with the connector interface; and
   b) a first power application circuit coupled to the connector interface for applying a first power in a time delayed and gradual manner to the hot docking disk drive making contact with the connector interface, the first power being applied in the time delayed and gradual manner in response to receiving a first time delayed enabling signal which is provided to the first power application circuit as a result the connector interface detecting the presence of the hot docking disk drive.

2. The disk drive interface as set forth in claim 1 wherein the first power application circuit applies power supply from a +12 v line in the time delayed and gradual manner to the hot docking disk drive making contact with the connector interface.

3. The disk drive interface as set forth in claim 1 wherein the disk drive interface further comprises
   c) a delay circuit coupled to the connector interface and the first power application circuit for receiving a detection signal denoting the presence of the hot docking disk drive from the connector interface, and in response, delaying for a predetermined amount of time, and then providing the first properly time delayed enabling signal to the first power application circuit.

4. The disk drive interface as set forth in claim 1 wherein the disk drive interface further comprises
   c) a second power application circuit coupled to the connector interface for applying a second power in a time delayed and gradual manner to the hot docking disk drive making contact with the connector interface, the second power being applied in the time delayed manner in response to receiving a second time delayed enabling signal which is provided to the second power application circuit as a result the connector interface detecting the presence of the hot docking disk drive.

5. The disk drive interface as set forth in claim 1 wherein the disk drive interface further comprises:
   d) a delay circuit coupled to the connector interface, the first and the second power application circuits for receiving a detection signal denoting the presence of the hot docking disk drive from the connector interface, and in response, delaying for a predetermined amount of time, and then providing the first and the second properly time delayed enabling signals to the first and the second power application circuits respectively.

6. The disk drive interface as set forth in claim 3 wherein the delay circuit further factors into consideration a fault state of the hot docking disk drive in providing the first properly time delayed enabling signal.

7. The disk drive interface as set forth in claim 4 wherein the second power application circuit applies power supply from a +5 v line in a time delayed and gradual manner to the hot docking disk drive making contact with the connector interface.

8. The disk drive interface as set forth in claim 5 wherein the delay circuit further factors into consideration a fault state of the hot docking disk drive in providing the first and the second properly time delayed enabling signals.

9. A disk drive controller comprising:
   a) a plurality of disk drive interfaces, each disk drive interface having
      a.1) a connector interface for mating with a hot docking disk drive having equal length connecting pins and detecting the hot docking disk drive's presence when the hot docking disk drive's equal length connecting pins make contact with the connector interface, and
      a.2) a first power application circuit coupled to the connector interface for applying a first power in a time delayed and gradual manner to the hot docking disk drive making contact with the connector interface, the first power being applied in the time delayed and gradual manner in response to receiving a first time delayed enabling signal which is provided to the first power application circuit as a result the connector interface detecting the presence of the hot docking disk drive.

10. The disk drive controller as set forth in claim 9 wherein each disk drive interface further comprises:
    a.3) a delay circuit coupled to the connector interface and the first power application circuit for receiving a detection signal denoting the presence of the hot docking disk drive from the connector interface, and in response, delaying for a predetermined amount of time, and then providing the first properly time delayed enabling signal to the first power application circuit.

11. The disk drive controller as set forth in claim 9 wherein each disk drive interface further comprises
    a.3) a second power application circuit coupled to the connector interface for applying a second power in a time delayed and gradual manner to the hot docking disk drive making contact with the connector interface, the second power being applied in the time delayed manner in response to receiving a second time delayed enabling signal provided as a result the connector interface detecting the presence of the hot docking disk drive.

12. The disk drive controller as set forth in claim 9, wherein the disk drive controller further comprises:
    b) a microcontroller coupled to the plurality of disk drive interfaces for receiving a signal denoting presence of a disk drive at the connector interface from each of the disk drive interface, and in response, delaying for a predetermined amount of time, and providing each of the disk drive interfaces with a first properly time delayed enabling signal.

13. The disk drive controller as set forth in claim 11 wherein each disk drive interface further comprises:
    a.4) a delay circuit coupled to the connector interface, the first and the second power application circuits for receiving a detection signal denoting the presence of the hot docking disk drive from the connector interface, and in response, delaying for a predetermined amount of time, and then providing the first and the second properly time delayed enabling signals to the first and the second power application circuits respectively.

14. The disk drive controller as set forth in claim 12 wherein the microcontroller further receives a fault state of the docked disk drive for each disk drive interface, and factors the fault state into providing the corresponding first properly time delayed enabling signal.

15. The disk drive controller as set forth in claim 12 wherein each disk drive controller further comprises c) a second power application circuit coupled to the connector interface for applying a second power in a time delayed and gradual manner to the hot docking disk drive making contact with the connector interface, the second power being applied in the time delayed manner in response to receiving a second time delayed enabling signal which is provided to the second power application circuit as a result the connector interface detecting the presence of the hot docking disk drive.

16. The disk drive controller as set forth in claim 15 wherein the microcontroller further receives a fault state of the docked disk drive for each disk drive interface, and factors the fault state into providing the corresponding first and second properly time delayed enabling signals.

17. A computer system comprising:

a) a plurality of disk drives; and b) a disk drive controller adapted for hot docking the disk drives, including b.1) a plurality of disk drive interfaces, each disk drive interface having b.1.1) a connector interface for mating with a hot docking disk drive having equal length connecting pins and detecting the hot docking disk drive's presence when the hot docking disk drive's equal length connecting pins make contact with the connector interface, and b.1.2) a first power application circuit coupled to the connector interface for applying a first power in a time delayed and gradual manner to the hot docking disk drive making contact with the connector interface, the first power being applied in the time delayed and gradual manner in response to receiving a first time delayed enabling signal which is provided to the first power application circuit as a result the connector interface detecting the presence of the hot docking disk drive.

18. The computer system as set forth in claim 17 wherein each disk drive interface further comprises:

b.1.3) a delay circuit coupled to the connector interface and the first power application circuit for receiving a detection signal denoting the presence of the hot docking disk drive from the connector interface, and in response, delaying for a predetermined amount of time, and then providing the first properly time delayed enabling signal to the first power application circuit.

19. The computer system as set forth in claim 17 wherein each disk drive interface further comprises b.1.3) a second power application circuit coupled to the connector interface for applying a second power in a time delayed and gradual manner to the hot docking disk drive making contact with the connector interface, the second power being applied in the time delayed and gradual manner in response to receiving a second time delayed enabling signal which is provided to the second power application circuit as a result the connector interface detecting the presence of the hot docking disk drive.

20. The computer system as set forth in claim 17, wherein the disk drive controller further comprises:

b.2) a microcontroller coupled to the plurality of disk drive interfaces for receiving a signal denoting presence of a disk drive at the connector interface from each of the disk drive interface, and in response, delaying for a predetermined amount of time, and providing each of the disk drive interfaces with a first properly time delayed enabling signal.

21. The computer system as set forth in claim 17 wherein each disk drive interface further comprises b.1.3) a second power application circuit coupled to the connector interface for applying a second power in a time delayed and gradual manner to the hot docking disk drive making contact with the connector interface, the second power being applied in the time delayed and gradual manner in response to receiving a second time delayed enabling signal which is provided to the second power application circuit as a result the connector interface detecting the presence of the hot docking disk drive.

22. The computer system as set forth in claim 19 wherein each disk drive interface further comprises:

b.1.4) a delay circuit coupled to the connector interface, the first and the second power application circuits for receiving a detection signal denoting the presence of the hot docking disk drive from the connector interface, and in response, delaying for a predetermined amount of time, and then providing the first and the second properly time delayed enabling signals to the first and the second power application circuits respectively.

23. The computer system as set forth in claim 20 wherein the microcontroller further receives a fault state of the docked disk drive for each disk drive interface, and factors the fault state into providing the corresponding first properly time delayed enabling signal.

24. The computer system as set forth in claim 21 wherein the microcontroller further receives a fault state of the docked disk drive for each disk drive interface, and factors the fault state into providing the corresponding first and second properly time delayed enabling signals.

* * * * *

UNITED STATES PATENT AND TRADEMARK OFFICE
CERTIFICATE OF CORRECTION

PATENT NO. : 5,604,873

DATED : February 18, 1997

INVENTOR(S) : Fite et al.

It is certified that error appears in the above-identified patent and that said Letters Patent is hereby corrected as shown below:

In column 4 at line 59 delete "induding" and insert --including--

In column 7 at line 31 delete "induding" and insert --including--

Signed and Sealed this

Fifteenth Day of July, 1997

*Attest:*

BRUCE LEHMAN

*Attesting Officer*  Commissioner of Patents and Trademarks